(12) United States Patent
Di Leo

(10) Patent No.: US 8,657,507 B2
(45) Date of Patent: Feb. 25, 2014

(54) SYSTEM FOR CAMERA STABILIZATION

(71) Applicant: The Alba Group, Ltd., Sun Valley, CA (US)

(72) Inventor: Mario F. Di Leo, Van Nuys, CA (US)

(73) Assignee: The Alba Group, Ltd., Sun Valley, CA (US)

( * ) Notice: Subject to any disclaimer, the term of this patent is extended or adjusted under 35 U.S.C. 154(b) by 8 days.

(21) Appl. No.: 13/646,346

(22) Filed: Oct. 5, 2012

(65) Prior Publication Data

US 2013/0094847 A1    Apr. 18, 2013

Related U.S. Application Data

(60) Provisional application No. 61/627,691, filed on Oct. 17, 2011.

(51) Int. Cl.
*G03B 17/00* (2006.01)
*G03B 17/56* (2006.01)

(52) U.S. Cl.
CPC ..................................... *G03B 17/56* (2013.01)
USPC ........................................................ 396/420

(58) Field of Classification Search
CPC ....................................................... G03B 17/56
USPC ................................................. 396/420–422
See application file for complete search history.

(56) References Cited

U.S. PATENT DOCUMENTS

| | | |
|---|---|---|
| 2,746,369 A | 5/1956 | Beard et al. |
| 2,873,645 A | 2/1959 | Horton |
| 2,945,428 A | 7/1960 | Dearborn |
| 3,044,346 A | 7/1962 | Fieux |
| 3,332,593 A | 7/1967 | Fauser |
| 3,900,140 A | 8/1975 | Kelso et al. |
| 4,017,168 A | 4/1977 | Brown et al. |
| 4,037,763 A * | 7/1977 | Turchen ........................ 224/153 |
| 4,082,436 A | 4/1978 | Gottschalk |
| 4,091,975 A | 5/1978 | Russell |
| 4,206,983 A * | 6/1980 | Nettman et al. ............... 352/243 |
| 4,244,500 A | 1/1981 | Fournier |
| 4,437,753 A | 3/1984 | Dunn et al. |

(Continued)

FOREIGN PATENT DOCUMENTS

JP     2003259180 A     9/2003

OTHER PUBLICATIONS

International Search Report of Mar. 8, 2013.

*Primary Examiner* — Clayton E Laballe
*Assistant Examiner* — Noam Reisner
(74) *Attorney, Agent, or Firm* — David J. Pitman; Fulwider Patton LLP

(57) ABSTRACT

Apparatus for supporting a camera comprising two shoulder supports. Two elongate rods extend generally forwards, each rod having a front end and a back end. Each rod pivots about a point between the front end and the back end, the pivot point on each rod being supported by a respective shoulder support. The front ends of each rod are operably connected to each other via a support structure that is configured for receiving and supporting a camera, the support structure comprising three elongate plates connected to each other in series, namely, a left plate, a center plate, and a right plate, wherein each of two opposite ends of the center plate are rotatably pin jointed to an inner end of each of the left plate and the right plate.

27 Claims, 10 Drawing Sheets

(56) References Cited

U.S. PATENT DOCUMENTS

| | | |
|---|---|---|
| 4,526,308 A | 7/1985 | Dovey |
| 4,542,966 A | 9/1985 | Knaudt |
| RE32,138 E | 5/1986 | Gottschalk |
| 4,727,390 A | 2/1988 | Brown |
| 4,943,820 A | 7/1990 | Larock et al. |
| 4,963,904 A | 10/1990 | Lee |
| 5,073,788 A | 12/1991 | Lingwall |
| 5,294,947 A | 3/1994 | Harrington et al. |
| 5,305,034 A | 4/1994 | Aratani et al. |
| 5,332,136 A | 7/1994 | Rudolph et al. |
| 5,360,196 A | 11/1994 | DiGiulio et al. |
| 5,397,041 A | 3/1995 | Bruseker |
| 5,424,791 A | 6/1995 | Campbell |
| 5,435,515 A | 7/1995 | DiGiulio et al. |
| 5,454,042 A | 9/1995 | Drever et al. |
| 5,513,784 A | 5/1996 | Pretorius |
| 5,612,756 A | 3/1997 | Kardach |
| 5,787,317 A | 7/1998 | Robinson |
| 5,890,025 A | 3/1999 | Hart |
| 6,056,449 A | 5/2000 | Hart et al. |
| 6,068,223 A | 5/2000 | Navarro |
| 6,457,880 B1 | 10/2002 | Slot et al. |
| 6,641,010 B2 | 11/2003 | Greene |
| 6,764,231 B1 | 7/2004 | Shubert |
| 6,929,409 B2 | 8/2005 | DeSorbo et al. |
| 7,000,879 B2 | 2/2006 | Gonzales |
| 7,097,368 B2 | 8/2006 | Gonzales |
| 7,293,924 B2 | 11/2007 | DeSorbo et al. |
| 7,372,502 B2 | 5/2008 | Gonzalez |
| 7,922,401 B2 | 4/2011 | McKay |
| 8,206,045 B2 | 6/2012 | Sweeney et al. |
| 2004/0223753 A1 | 11/2004 | Gale |
| 2010/0266270 A1 | 10/2010 | Pizzo et al. |
| 2011/0060564 A1* | 3/2011 | Hoge ................................ 703/2 |
| 2011/0080564 A1 | 4/2011 | Taylor |

* cited by examiner

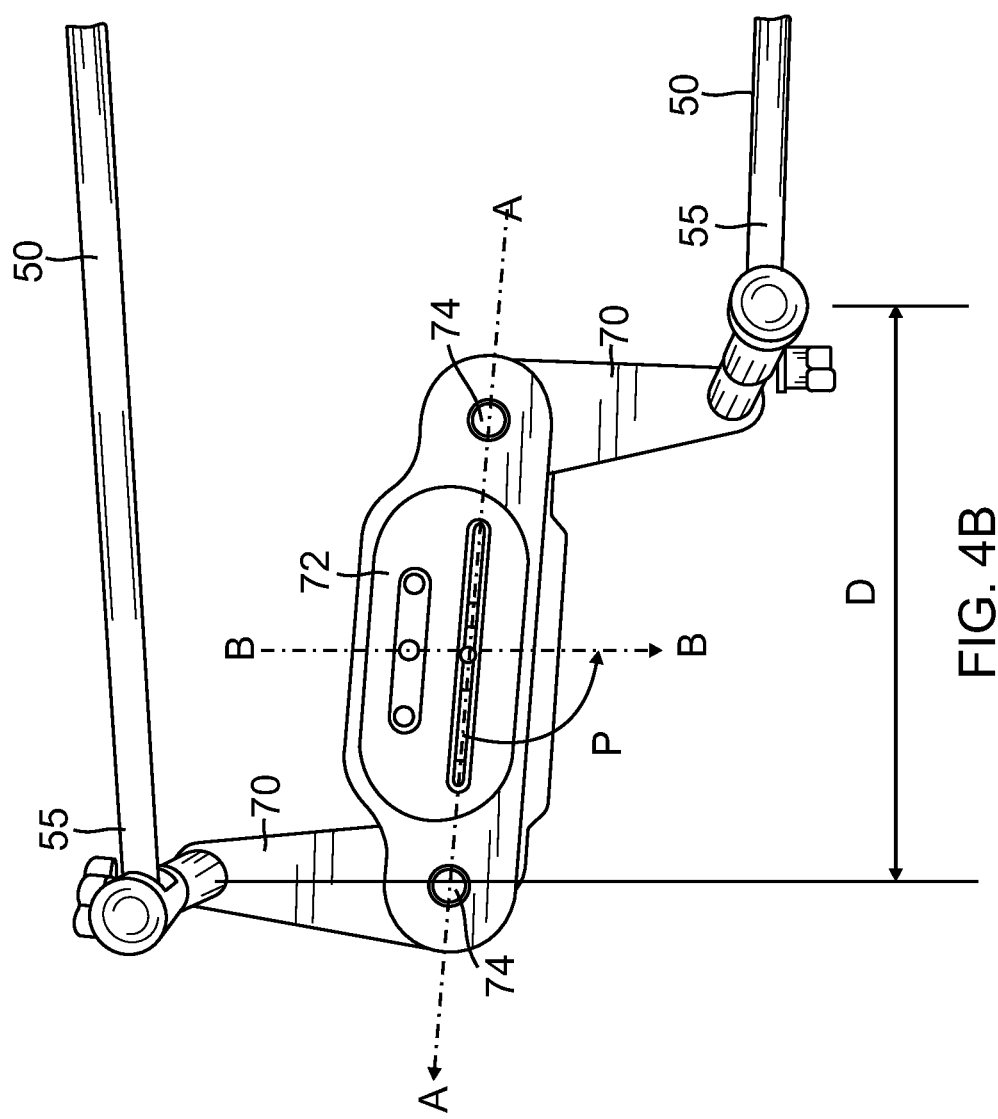

SYSTEM FOR CAMERA STABILIZATION

CROSS-REFERENCES TO RELATED APPLICATIONS

This application claims priority from U.S. Application No. 61/627,691, filed Oct. 17, 2011 which is incorporated by reference in its entirety.

BACKGROUND

The present invention relates generally to photographic equipment and more particularly to a system for stabilizing a mobile camera relative to its main support means, in this example a cameraman's body, while at the same time permitting the cameraman to manipulate and maneuver the camera with dexterity. Hand held cameras, both movie cameras and still cameras, are subject to undesirable motion from the body of a cameraman which results in unacceptable images. It is, therefore, desirable to stabilize the camera position, reduce to a minimum the transfer of body motion to the camera, and to permit the camera to be under stabilized control by the cameraman under both stationary and mobile conditions.

Prior proposed stabilizing devices for photographic camera equipment or other like devices have included various types of apparatus carried by the cameraman to facilitate stabilizing control of the camera.

However, generally speaking, prior art hand controlled and stabilized camera mounting apparatus, while vastly improving stabilization of the camera and isolating the camera from unwanted motions of the cameraman's body, still include problems of precise control of the camera position relative to the cameraman's body without imposing undue stress or strain on the cameraman. One of the problems confronting cameramen using prior art systems is that they still require an excessive amount of body movement and orientation to capture the desired image. While it is feasible for the cameraman to orient his body to obtain a desired image, to do so for extended periods while shooting movie images becomes an excessive strain on the cameraman's body. In short, presently known stabilization systems do not give the cameraman sufficient flexibility and control over the camera to allow twisting and rotation about multiple axes simultaneously.

Thus there is a need in the art to solve these problems by making camera support and stabilization systems more flexible and giving a greater range of camera orientations. The present invention addresses these and other problems.

SUMMARY OF THE INVENTION

The present invention is a system for camera stabilization, or, a rig for supporting a camera. In preferred embodiments, the rig comprises two shoulder supports, each configured to fit over a shoulder of a user and each being operably connected to the other. Two elongate rods extend generally forwards, each rod having a front end and a back end, wherein, each rod is located to pivotingly rotate about a pivot point between the front end and the back end, the pivot point on each rod being supported by a respective shoulder support. In some embodiments, the front end of one rod is operably connected to the front end of the other rod via a support structure that is configured for supporting a camera. In some embodiments, the support structure comprises three elongate plates connected to each other in series, namely, a left plate, a center plate, and a right plate, wherein each of two opposite ends of the center plate are connected by first pin joints to an inner end of each of the left plate and the right plate respectively, the first pin joints being configured to permit rotation of the plates in a horizontal plane. An outer end of each of the left plate and the right plate is operably connected to the front end of each of the rod respectively by second pin joints, the second pin joints being configured to permit rotation of the three plates in a horizontal plane, such that the three plates are configured to be movable by the user to form a desired articulated shape.

In some embodiments, the rig may further include two downwardly extending elongate handles that are connected to the support structure, whereby movement of the handles by a user is capable of altering the articulated shape of the support structure. Each handle may be connected to the support structure at a location of one of the first pin joints respectively. Furthermore, each handle may be configured in relation to each of the first pin joints such that axial rotation of each handle causes a threaded pin in the respective first pin joint to rotate and, temporarily, to frictionally lock the center plate to a respective left plate or right plate.

In some embodiments, the rig may include two downwardly extending hangers, each hanger having an upper end and a lower end, each hanger upper end being operably connected by a third pin joint to the front end of one of the rods, to permit rotation of each hanger backwards or forwards in a vertical plane extending substantially parallel with the rods, and wherein each hanger lower end is connected by the second pin-joint to the left or right plate respectively. Each third pin joint between rod and hanger may include a threaded pin that is configured to be rotable to temporarily lock the third pin-joint against rotation.

In some embodiments, the rig may further include a number of springs being at least one spring having an upper end and a lower end, the upper end being operably connected to at least one rod, the lower end being connected to an anchor that is operably connected to and held immovable in relation to the shoulder supports. In other embodiments, the number of springs is at least two springs, each spring being configured to extend from the back end of one of the rods respectively to the anchor, each spring being configured to provide a force to pivotingly bias the front end of each rod respectively generally upwards. Here, each spring may be oriented in relation to the rig to include a component of orientation that is horizontal, whereby the upper end of each spring applies a vector component of force that biases the back end of each rod respectively to move horizontally inwards towards a vertical symmetry line of the rig, and also pivotingly biases the front end of each rod respectively to move horizontally outwards away from the symmetry line.

In some embodiments of the invention, each rod may be positioned to pivotingly rotate about a pivot situated between the front end and the back end, each pivot being supported by a respective shoulder support, and further wherein, the rods are configured so that one rod is substantially independently movable in relation to the other rod. Here, a number of springs being at least one spring having an upper end and a lower end may be provided, the upper end being operably connected to at least one rod, the lower end being connected to an anchor that is operably connected to and held immovable in relation to the shoulder supports. In some embodiments, the number of springs may be at least two springs, each spring being configured to extend from the back end of one of the rods respectively to the anchor, each spring being configured to provide a force to pivotingly bias the front end of each rod respectively generally upwards. In some embodiments, each pivot is configured to provide each rod at least three degrees of freedom in relation to the pivot, namely: vertical rotation about the pivot; horizontal rotation about the pivot; and, sliding motion through the pivot. In further embodiments, each pivot may be configured to provide each rod with a fourth degree of freedom in relation to the pivot, namely, twisting motion about an axis of the rod. Each pivot may define a cylindrical hole for slidably receiving each rod respectively, and each pivot may include a threaded pin passing through the pivot, the pin being rotatable to sequentially lock and unlock the pivot, whereby the pivot has an unlocked condition in which the rod may slide through the cylindrical hole, and a locked condition in which the rod is frictionally prevented from sliding through the cylindrical hole. In some embodiments, each pivot may include an elongate axle having an axis that extends generally vertically, the axle being fixed to one of the shoulder supports and being configured to be rotatable about the axis; and a receiver connected to an upper end of the axle by a pin-joint configured to permit rotation of the receiver in a vertical plane, the receiver defining the cylindrical hole for receiving the rod. In other embodiments, each pivot includes a ball that is fixed to one of the shoulder supports; and a socket configured to receive the ball and to rotate about the ball both about a horizontal axis and about a vertical axis, the socket defining the cylindrical hole for receiving the rod.

In some embodiments of the invention, the rig may include two shoulder supports, each configured to fit over a shoulder of a user and each being operably connected to the other, and two extender elements, each extender element connected to a shoulder support respectively and extending downwardly. A belt may be provided for stabilizing the shoulder supports, the belt including a rigid skeleton, the belt being separated from the shoulder supports by a vertical distance. Two elongate rods may be provided, extending generally forwards, each rod having a front end and a back end and being configured to support a camera at the front end, wherein, each rod is positioned to pivotingly rotate about a pivot situated between the front end and the back end, each pivot being supported by a respective shoulder support. A number of springs may be provided being at least one spring having an upper end and a lower end, the upper end being operably connected to at least one rod, the lower end being connected to an anchor that is operably connected to the rigid skeleton. Each extender element may be configured to slidingly pass through the rigid skeleton, and further wherein each extender element may include a registration pin for locking a position of the extender element in relation to the skeleton, whereby the vertical distance may be adjusted to a desired amount.

In some embodiments, the number of springs may be at least two springs, each spring being configured to extend from the back end of one of the rods respectively to the anchor, each spring being configured to provide a force to pivotingly bias the front end of each rod respectively generally upwards. In some embodiments, each spring may be oriented in relation to the rig to include a component of orientation that is horizontal, whereby the upper end of each spring applies a vector component of force that biases the back end of each rod respectively to move horizontally inwards towards a symmetry line of the rig, and also pivotingly biases the front end of each rod respectively to move horizontally outwards away from the symmetry line In some embodiments, the anchor may slidingly pass through the skeleton, the anchor including a registration pin for locking the position of the anchor in relation to the skeleton, whereby the anchor may be adjustable in a vertical direction in relation to the shoulder supports, and further whereby, tension in the at least one spring may be adjusted.

In some embodiments of the invention, the rig includes a support structure that is horizontally aligned and configured to support a camera, the support structure having two opposite ends and being suspended from two hangers, each hanger having an upper end and a lower end, the upper end of each hanger being operably connected by a first pin joint to the front end of each rod respectively, the lower end of each hanger being connected to one of the two ends of the support structure respectively. The support structure may be configured to rotate about an axis passing through the first pin joints. In some embodiments, two downwardly extending elongate handles may be provided that are connected to the support structure whereby movement of the handles by a user is capable of rotating the support structure about the axis. In some embodiments, the support structure comprises three elongate plates connected to each other in series, namely, a left plate, a center plate, and a right plate, wherein each of two opposite ends of the center plate are connected by second pin-joints to an inner end of each of the left plate and the right plate respectively, the second pin joints being configured to permit rotation of the plates in a horizontal plane. An outer end of each of the left plate and the right plate is connected to the lower end of each of the hangers respectively by a third pin-joint in a horizontal plane, whereby the three plates are configured to be movable by the user to form a desired articulated shape. In some embodiments, each handle is connected to the support structure at a location of one of the two second pin joints respectively, and each handle may be configured in relation to each of the second pin joints such that axial rotation of each handle causes a threaded pin in the respective second pin joint to rotate and, temporarily, to frictionally lock the center plate to a respective left plate or right plate.

In some embodiments of the invention, the rig may include two shoulder supports, each configured to fit over a shoulder of a user and each being operably connected to the other. Two elongate rods may be provided, extending generally forwards, each rod having a front end and a back end, and being configured to support a camera at the front end. Each rod may be positioned to pivotingly rotate about a pivot situated between the front end and the back end, each pivot being supported by a respective shoulder support; and further wherein, each rod is configured in relation to each respective pivot so that each rod enjoys at least three degrees of freedom, namely, vertical rotation about the pivot, horizontal rotation about the pivot, and sliding motion through the pivot. A number of springs being at least one spring having an upper end and a lower end may be provided, the upper end being operably connected to at least one rod, the lower end being connected to an anchor that is operably connected to, and held immovable in relation to, the shoulder supports. In some embodiments, the number of springs is at least two springs, each spring being configured to extend from the back end of one of the rods respectively to the anchor and each spring is configured to provide a force to pivotingly bias the front end of each rod respectively generally upwards. In some embodiments, each rod may be configured in relation to each respective pivot so that each rod enjoys a fourth degree of freedom, namely twisting about an axis of the rod. In some embodiments, each rod is configured in relation to each respective pivot so that the three degrees of freedom enjoyed by one rod are substantially independent of the three degrees of freedom enjoyed by the other rod.

In some embodiments of the invention, the rig may include a support structure having opposite ends and being configured to support a camera, wherein each opposite end is connected to each rod respectively at a connection point on each rod. Each rod may be located to pivotingly rotate about one of two pivots located, respectively, between the front end and the back end of each rod, each pivot being supported by a respective shoulder support. Each pivot may be configured to provide each respective rod with movement under at least one degree of freedom selected from a group of three degrees of freedom, namely: vertical rotation about the pivot; horizontal rotation about the pivot; and, sliding motion backwards and, alternatingly, forwards through the pivot by which the rod is capable of moving the connection point closer to the pivot and, alternatingly, further from the pivot respectively. Moreover, the at least one degree of freedom provided to one rod corresponds with the degree of freedom that is provided to the other rod, and further wherein, movement of one rod under the at least one degree of freedom is substantially independent of the movement of the other rod under a corresponding degree of freedom.

In other embodiments, each pivot may be configured to provide each respective rod with movement under at least two degrees of freedom selected from the group of three degrees of freedom. Here, movement of one rod under each of the at least two degrees of freedom is substantially independent of the movement of the other rod under corresponding degrees of freedom.

In yet other embodiments, each pivot may be configured to provide each respective rod with movement under the three degrees of freedom selected from the list of three degrees of freedom. Here, movement of one rod under each of the three degrees of freedom is substantially independent of the movement of the other rod under corresponding degrees of freedom.

As will be apparent from the detailed description herein below, having two rods for supporting a camera that possess such independence of motion from each other as described, gives the cameraman using the present invention great versatility and dexterity in positioning the camera in a great number of positions that are not possible in prior art camera stabilization systems.

These and other advantages will become apparent upon reading the detailed description of preferred embodiments in conjunction with the drawings.

BRIEF DESCRIPTION OF THE DRAWINGS

FIG. 4B is a top detail view of the apparatus of FIG. 1, showing a second condition.

DETAILED DESCRIPTION OF THE PREFERRED EMBODIMENTS

Figure 1:
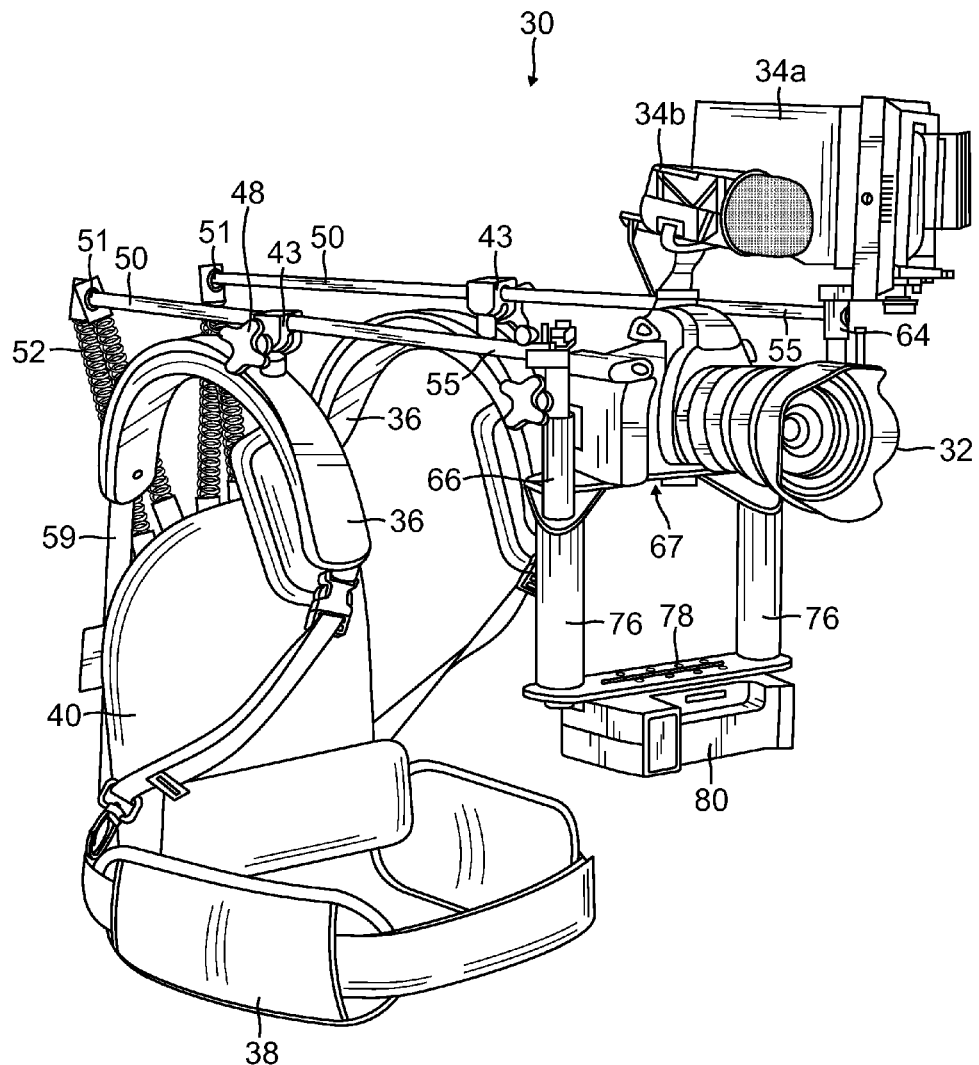
FIG. 1 is a perspective view of an apparatus having features of the present invention.

This specification describes, with reference to the drawings, preferred embodiments of the invention. In FIG. 1, a camera is shown in conjunction with an embodiment of the rig apparatus of the invention. However, in subsequent figures, the camera has been removed for greater clarity of the rig apparatus and its components. It will be appreciated that the other figures, where appropriate, are to be envisaged with a camera, such as is shown in FIG. 1.

Referring first to FIG. 1, an embodiment of a rig having features of the invention is indicated by reference numeral 30, the rig being adapted to be worn by a cameraman to facilitate maneuvering a camera 32 and related equipment 34a, 34b while stabilizing the position of the camera in relation to the cameraman when he is walking, turning, running or moving up and down steps. As later described in more detail, such freedom of movement of the camera 32 requires stabilization of the position of the camera in a spaced forward relation from the cameraman while at the same time permitting the cameraman to orient the camera, in relation to himself and the object being photographed, with great dexterity and with a wide range of movement.

As used herein, the terms "apparatus" and "rig" are used interchangeably. Further, the term "operably connected," when used to describe two elements being "operably connected," is intended to include the possibility that intervening structure may be included between the two elements, so that the two elements may be connected to each other via the intervening structure. However, the term is not intended to mean that intervening structure must necessarily be included between the elements. Moreover, the terms of orientation that are used herein, backwards, forwards, sideways etc. are to be understood in relation to the orientation of a cameraman wearing the rig 30 and standing erect. Also, "inner" means towards a vertical line of symmetry of the rig, and "outer" means away from a vertical line of symmetry of the rig, which symmetry line may be envisaged with reference to FIG. 3.

In general, the rig 30 comprises a pair of curved shoulder supports 36 configured to rest comfortably and securely on the shoulders of a user, or cameraman/woman. The shoulder supports 36 are in turn operably connected to a supportive belt 38, which may include a padded back brace 40. The combined shoulder supports, belt, and brace, are configured to be immovable in relation to each other when the rig is in use (they may be movably adjusted before they are placed on the cameraman), but they support a number of movable parts that are configured to provide the cameraman with dexterity in orienting the camera while at the same time supporting and stabilizing the camera.

Figure 2A:
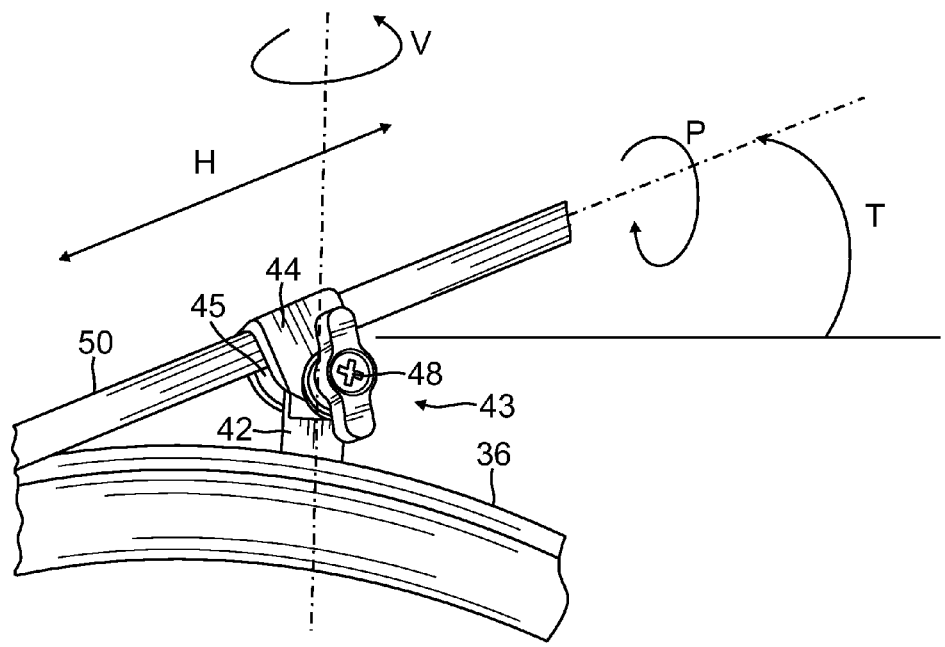
FIG. 2A is a side detail view of an aspect of the apparatus of FIG. 1.
Figure 2B:
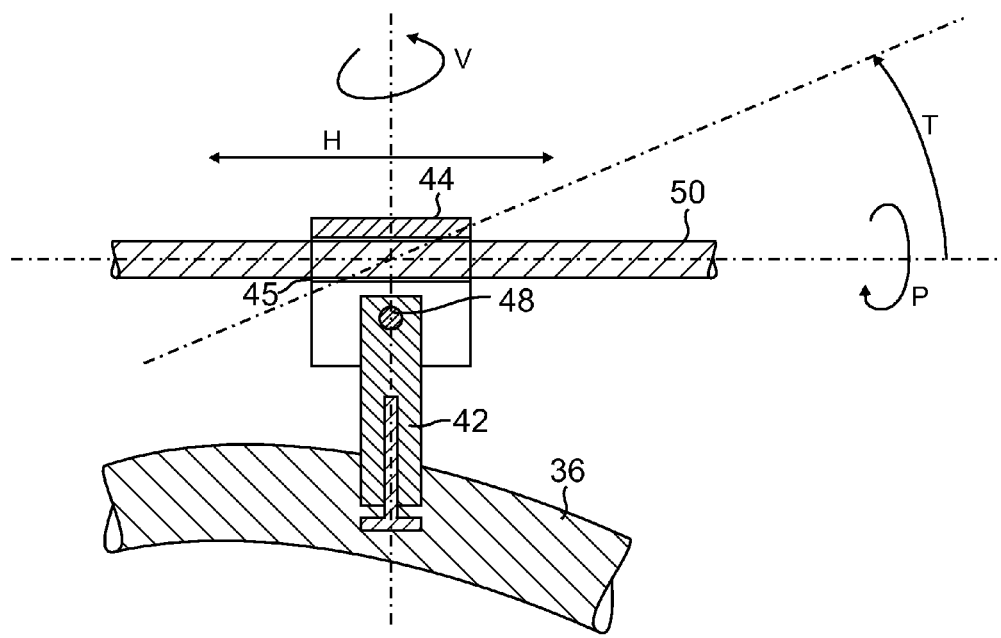
FIG. 2B is a sectional view through the detail of FIG. 2A.

With reference to FIGS. 2A and 2B, at or near the apex of each shoulder support 36, a pivot 43 is formed. In some embodiments, the pivot 43 comprises an axle 42 which is connected, and extends upwardly from, the respective shoulder support. Each axle 42 is configured in relation to the respective shoulder support to rotate about an axis extending upwardly through the axle, as indicated by the arrow V in FIGS. 2 and 2B. To each axle 42 is attached a slide receiver 44 which defines a cylindrical hole 45 passing through the slide receiver. A rotatable screw 48 passes through both the axle 42 and the slide receiver 44, thereby securing the axle to the slide receiver. An elongate cylindrical slide rod 50 passes through the cylindrical hole 45 in each slide receiver 44, and is sized to slide backwards and forwards through the hole as indicated by the arrow H in FIGS. 2A and 2B. The slide receiver is configured to rotate in a vertical plane in relation to the pivot axle 42 as indicated by the arrow T in FIG. 2. The rod may also be configured to twist about an elongate axis of the rod, as indicated by the arrow P in FIGS. 2A and 2B. The pivot 43 is configured so that sufficient rotation of the screw 48 will reduce the size of the hole 45 and lock the rod 50 against sliding movement, and against twisting rotation.

Figure 2C:
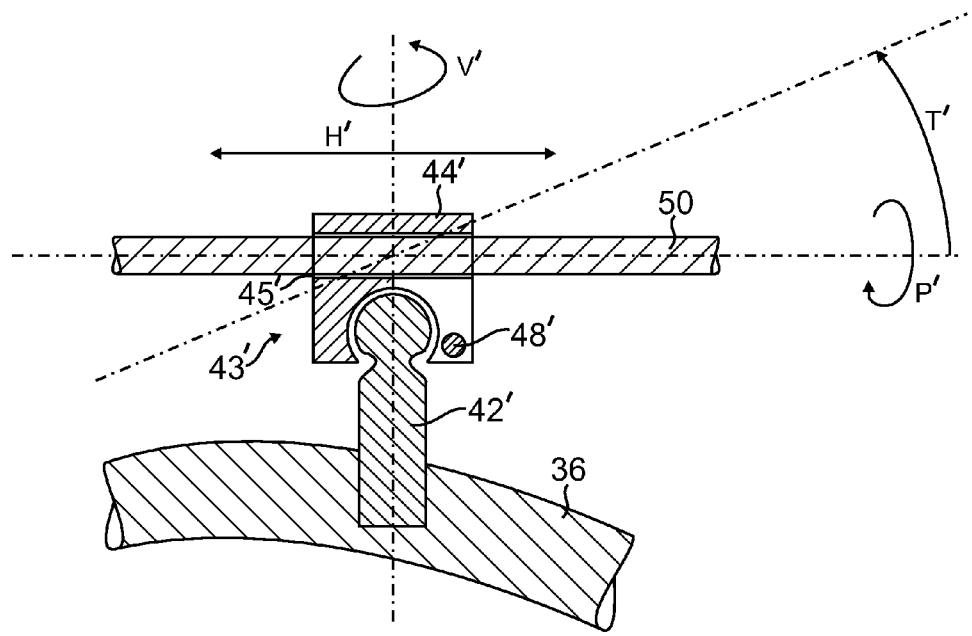
FIG. 2C is a sectional view through an alternative embodiment of the detail of FIG. 2A.

In another embodiment as exemplified in FIG. 2C, a pivot 43' comprises a ball 42' which is connected to, and extends upwardly from, the respective shoulder support. Each ball 42' is configured to mate with a socket 44' configured to receive and hold the ball. Each socket 44' defines a cylindrical hole 45' passing through the socket. An elongate cylindrical rod 50 passes through the cylindrical hole 45' in each socket, and is sized to slide backwards and forwards through the hole as indicated by the arrow H' in FIG. 2C. The socket is configured to rotate about a horizontal axis as indicated by the arrow T', and is also configured to rotate about a vertical axis as indicated by the arrow V' in FIG. 2C. The socket may also be configured to twist about an elongate axis of the rod, as indicated by the arrow P' in FIG. 2C. A rotatable screw 48' passes through the socket. The pivot 43' is configured so that sufficient rotation of the screw 48' will reduce the size of the hole 45' and lock the rod 50 against sliding movement, and against twisting rotation.

Thus, in some embodiments, the rig has a configuration that may allow the cameraman to move the rods 50 with up to four degrees of freedom in relation to the shoulder supports 36. First, he may pivot each rod 50 in a vertical plane in relation to the shoulder supports, as indicated by the arrows T and T'. Second he may rotate each rod horizontally in relation to the shoulder supports, as indicated by the arrows V and V'. Third, he may slide each rod backward and forward in relation to the shoulder supports when the pivot is not locked, as indicated by the arrows H and H'. Fourth, he may twist each rod about its own axis, when the pivot is not locked, as indicated by the arrows P and P'. Additionally, as will be set forth more fully below, in some embodiments movement under some of these degrees of freedom in motion may be applied by the cameraman to one rod substantially independently of any movement that is applied to the other rod.

By the term "substantially independently," it is meant that some relatively small movements, within the scope of the described structure may be given to one rod without imparting the same movement to the other rod. However, as will be evident from the description herein, the movements of the rods cannot be limitlessly independent of each other, to the extent that the front ends of the rods are operably connected to each other via the support structure 67 (described more fully below). Because the support structure may be made to change its shape, it allows a relatively large spatial envelope within which the front end of one rod may move in relation to the front end of the other rod while that other end of the rod is stationary. With regard to the rear ends of the rods, it will be appreciated that the rear end of one rod may move with substantial independence of the rear end of the other rod. Thus, the rods themselves, the front ends of the rods, and the rear ends of the rods, enjoy "substantial independence" of movement in relation to each other respectively, under any of up to four degrees of freedom, or combinations thereof. As will be seen, the wide range of movements afforded to the rods of the present invention, both absolutely and in relation to each other, provides a novel and highly advantageous dexterity in the way a cameraman may control the camera while it is supported by the rig 30.

Figure 3:
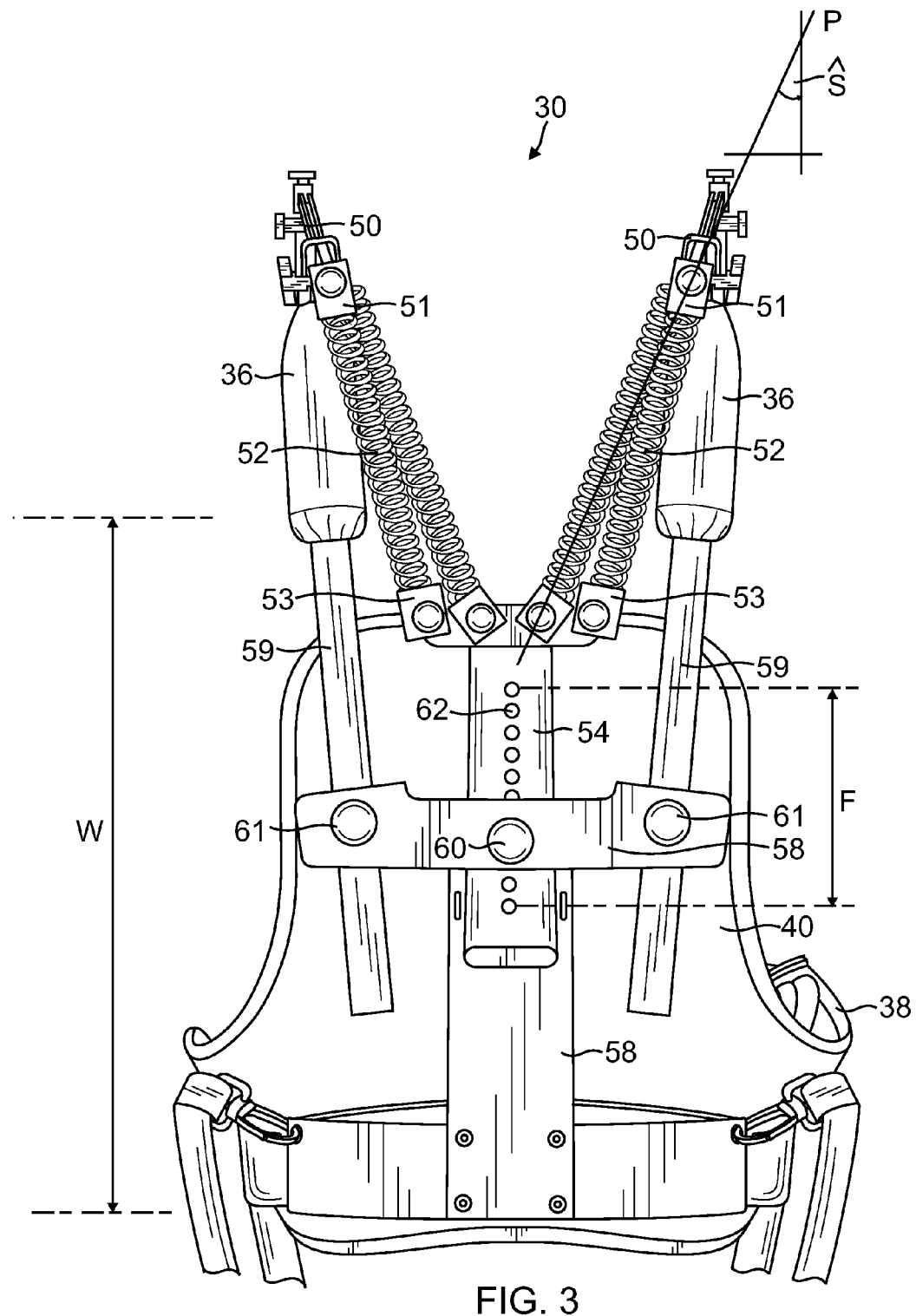
FIG. 3 is a rear elevation view of the apparatus of FIG. 1.

As may be understood with reference to FIG. 3, which is a rear view of one embodiment of the rig 30, the back end 51 of each rod 50 is attached to an upper end of at least one elongate spring 52 (helical metal or rubber tubes are preferred). In some embodiments, two springs may be attached to each rod, as shown in FIG. 3. A lower end 53 of each spring 52 is operably attached to an anchor 54. In some embodiments, the anchor may be configured to slide vertically in relation to a rigid skeleton structure 58 that is operably connected to the shoulder supports 36. The skeleton 58 is preferably made of metal, and may be removably attached to the back brace 40 and belt 38. A registration pin 60 may be provided to secure the anchor 54 against movement in relation to the skeleton. In one embodiment, the registration pin may be a set screw configured to either frictionally hold the anchor 54 in relation to the skeleton 58, or to enter one of a number of registration holes in the anchor for preventing movement of the anchor in relation to the skeleton. In another embodiment, the registration pin may be a spring loaded dowel configured to pass through a hole in both the skeleton 58 and the anchor 54. Where a registration dowel is used (as is exemplified in FIG. 3) at least one of the skeleton 58 and the anchor 54 may be provided with a plurality of registration holes 62 extending along a vertical line. Adjusting the registration between the anchor 54 and the skeleton 58, by selecting a desired registration hole 62 for the pin 60, will have the effect of adjusting the fixed position of the lower end of each spring 52 in relation to the height of the shoulder supports 36. This action will thereby adjust the range of movement permitted to the back end 51 of each rod 50, and hence, also the movement permitted to the front end of each rod. In a preferred embodiment, the overall travel of the anchor in relation to the skeleton may have a length "F" that is not less than 5 inches long, preferably between 5 inches and 10 inches long. In FIG. 3, the length F is shown as the extent of the registration holes. Where a friction set screw is used as the registration pin 60, no holes need be provided, but a travel length indicated by "F" will be provided over the length of the anchor 54 for frictional engagement.

Furthermore, in some embodiments, the distance between the shoulder supports 36 and the belt 38 (indicated as distance "W" in FIG. 3) may be adjusted to suit the particular physique of an individual cameraman. For example, in the case of a tall cameraman, the shoulder supports may be given a greater separation distance W from the waist belt. With reference to the embodiment shown in FIG. 3, this may be accomplished by the following exemplary structure. Extending downwardly from each shoulder support 36 is an elongate extender element 59. Each extender element 59 passes slidingly through a mating hole or detent (not visible in the figures) in the skeleton 58. A registration pin 61 is configured to secure the vertical position of the extender element 59 (and hence the shoulder support 36) in relation to the skeleton 58 (and hence the belt 38). The registration pin 61 may have the same configuration as the registration pin 60 used in conjunction with the anchor 54, in which case registration holes such as those described in the anchor 54 may be provided in the extender element 59. Once the cameraman has adjusted the setting "W" of the shoulder supports in relation to the belt to fit his physique by using the registration pins 61, he may then adjust the tension in the springs by adjusting the registration of the anchor 54 in relation to the skeleton 58 by using registration pin 60, as is described above. This double adjustment capability in the rig 30 imparts further advantages, because the rig can be custom fit to any cameraman while allowing the cameraman to maintaining a desired tension in the springs.

As seen with reference to FIG. 3, in some embodiments, the springs 52 may be given a partially horizontal or sideways orientation. This has the result that, where at least one spring is oriented with an angle S to the vertical, the upper end of the spring will include an inward component of force (in addition to a downward component of force) applied to the back end 51 of the rod 50. By pivoting action, this in turn will provide an outward component of force to the front end 55 of the rod. The advantage of this aspect will be described further below.

Figure 6:
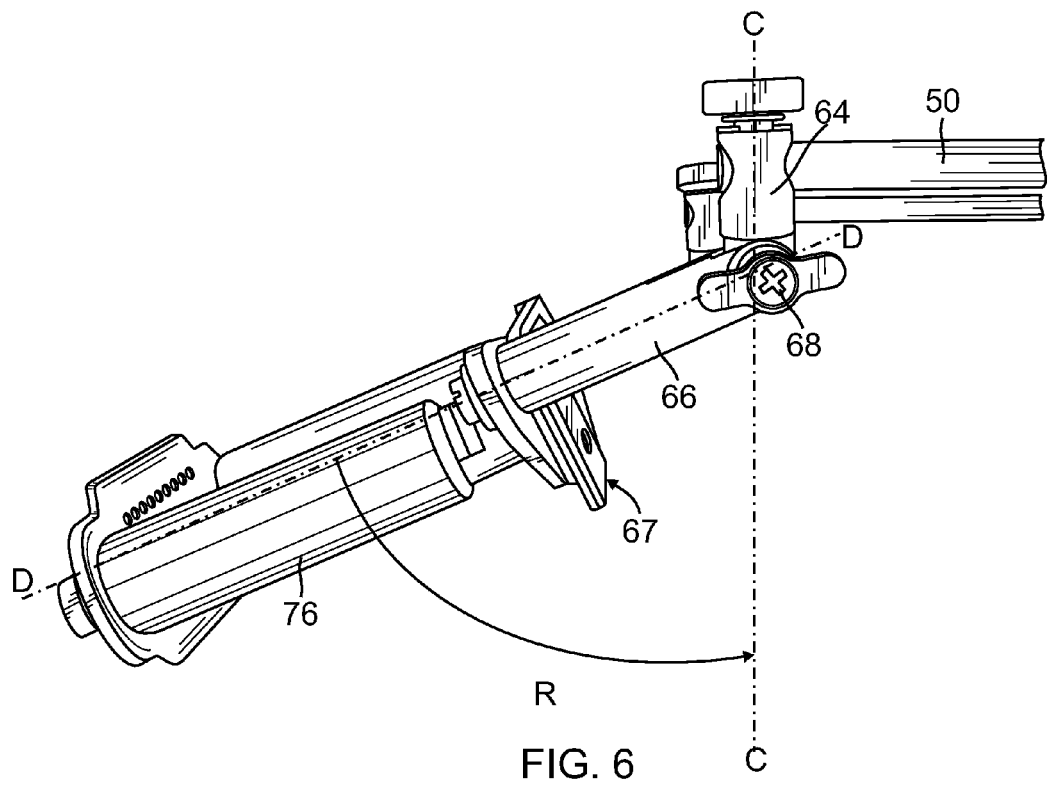
FIG. 6 is a side detail view of the apparatus of FIG. 1.

In some embodiments, as seen with reference to FIG. 4A-FIG. 4C and FIG. 5, the front end 55 of each rod 50 may be attached to a downward extending stub 64. In some embodiments, the connection between the rod 50 and the downward stub 64 may be rigid. An elongate hanger 66 is connected to the lower end of each downward stub 64 by a threaded pin 68 in a pin joint that permits backward and forward rotation of the hanger 66 in relation to the downward stub 64, as indicated by the arrow R in FIG. 6. The pin 68 is configured in relation to the joint so that its inward rotation by the user will cause the joint to lock, until it is rotated outward again.

Extending between lower ends of each hanger 66 is a horizontal support structure 67 that is made up of three discrete plates, namely two outer plates 70 (left and right outer plates) and a center plate 72. The support structure is configured to receive and support a camera (as exemplified in FIGS. 1 and 8A-C) that may be held by a known screw means onto the center plate 72. An outer end of each outer plate is connected by a pin 71 (best seen in FIG. 5) providing a horizontal pin joint to one of the hangers 66, so that each outer plate 70 may freely rotate horizontally in relation to its respective hanger 66. An inner end of each outer plate 70 is connected to an end of a center plate 72. A lockable pin joint is provided between each outer plate 70 and the center plate 72 as follows: a threaded pin 74 passes through an overlapping portion between each outer plate 70 and the center plate 72, the pin being configured, in a first condition, to permit each outer plate to rotate horizontally in relation to the center plate. Each pin 74 passes downwardly and is connected to a handle 76. Rotation of each of the handles 76 about its elongate axis will fix the corresponding pin 74 in a second condition to frictionally lock the respective outer plate 70 to the center plate 72.

Figure 8C:
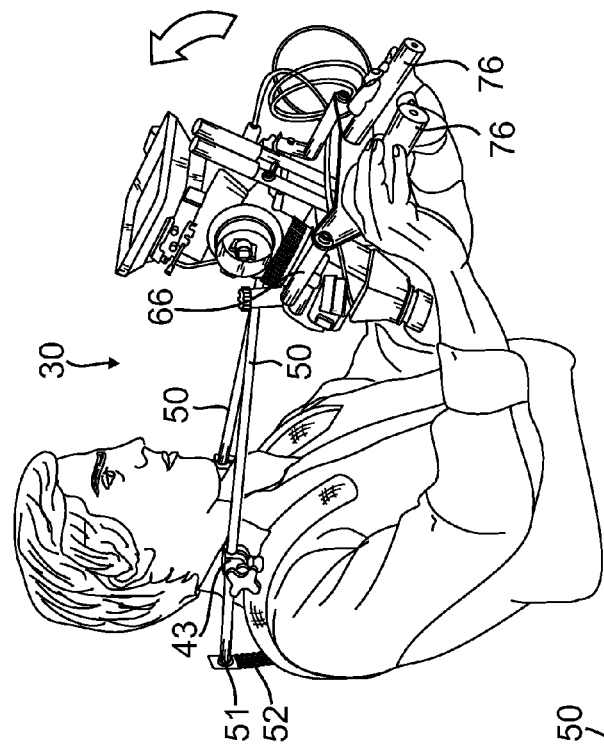
FIGS. 8A-C are sequential perspective views of the apparatus of FIG. 1, showing the apparatus in fifth, sixth, and seventh, conditions.
Figure 8B:
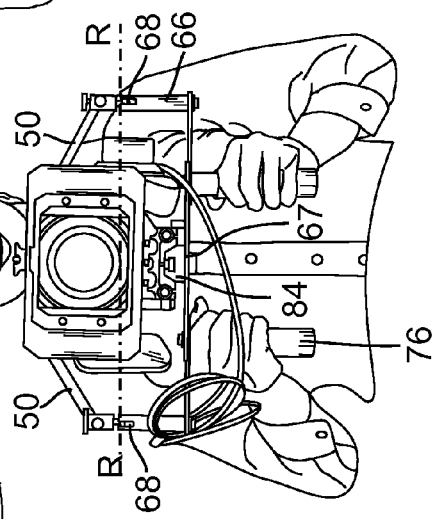
Figure 8A:
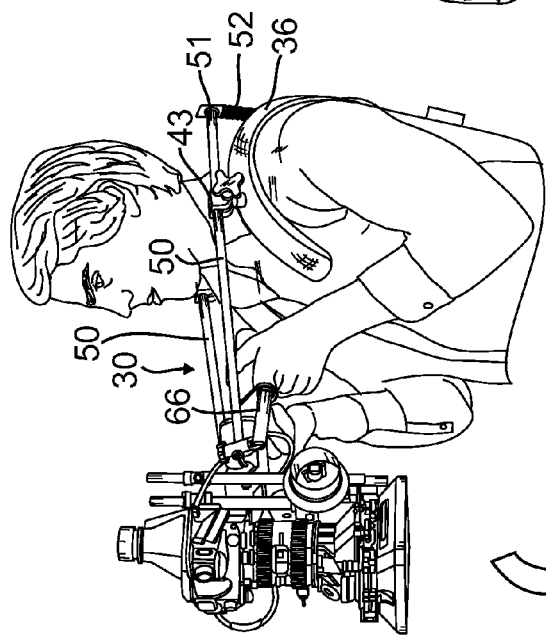

A first available function of the handles 76 is to permit the cameraman to rotate the camera about an axis R-R (best seen in FIG. 5 and FIGS. 8A-C) that extends horizontally between the two pins 68. The rotation, by angle "R," is also exemplified in FIG. 6, and it allows the cameraman to point the camera vertically downwards or vertically upwards as desired. As seen in FIGS. 8A-C, the angle R may extend from a maximum upwards to a minimum downwards in a range that exceeds 180 degrees. By simultaneously allowing the rods to tilt downwards while taking an upward shot, and to tilt upwards by taking a downward shot, this configuration also has the considerable advantage of permitting the cameraman to take upward looking shots from below of a subject without having to bend his back in order to align the camera upwardly from below. The cameraman may stand vertically, and by lowering the rods, his hands may push forwards on the handles 76 so that the camera lens points upwardly, from below. Equally, the cameraman may take a downward looking shot from above, by pushing the handles 76 upwards to elevate the front end of the rods, and pulling them backwards at the same time, the camera will orient itself correctly without the cameraman having to bend his back. All the while, the cameraman may review the contents of his camera screen by way of a digital viewing screen 34a attached to the front end of one of the rods, and for which the orientation to the cameraman remains substantially parallel with the rods, even if the camera is rotated by angle "R" in relation to the rods 50.

Figure 4A:
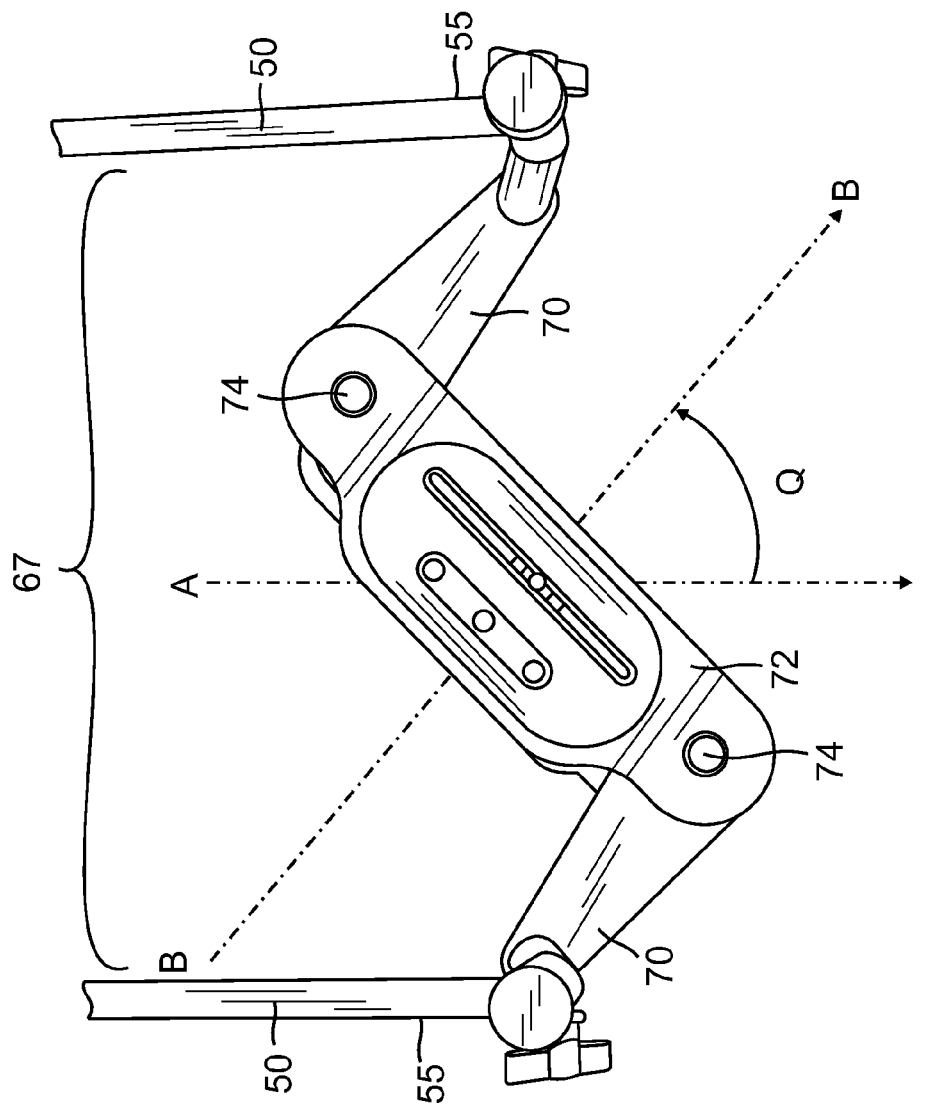
FIG. 4A is a top detail view of the apparatus of FIG. 1, showing a first condition.
Figure 4C:
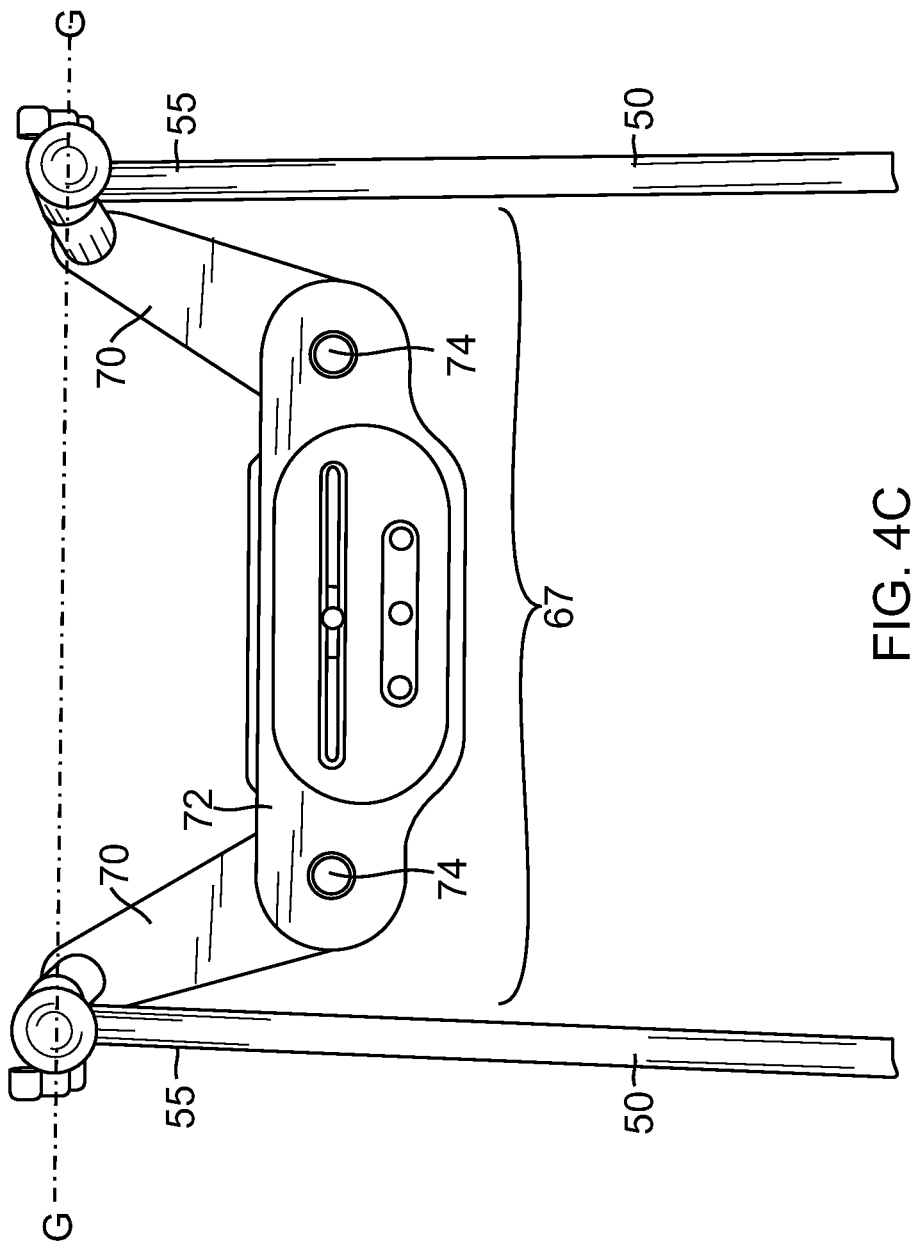
FIG. 4C is a top detail view of the apparatus of FIG. 1, showing a third condition.

A second available function of the handles 76 is to permit the cameraman to reconfigure the camera support structure 67 to have an articulated configuration in which an angle may be formed between the center plate 72 and each outer plate 70, as exemplified in FIGS. 4A-4C. As seen in FIG. 4A, this aspect allows the cameraman to rotate the camera about a vertical axis in relation to the rig 30. Where previously the camera lens may have pointed forward along an axis A-A as in FIG. 4A, the cameraman may, by moving the position of the handles 76, elect to rotate the camera lens by an angle Q in a horizontal plane about its vertical axis, to point the camera in a direction B-B that is offset sideways to the forward direction.

Moreover, if the cameraman desires to turn the camera at an angle approaching 90 degrees to a forward direction, as exemplified in FIG. 4B, he may do so by sliding one of the rods 50 forwards in its slide receiver 44 (or in its socket 44', depending on the embodiment), and sliding the other rod backwards, so that a distance "D," measured in a forward direction, separates the front ends 55 of the rods. This separation "D" creates a space that allows the cameraman to rotate the camera by an angle P which may be a full 90 degrees or even more, without the camera becoming into conflict with a downwardly extending hanger 66. In this regard, it will be appreciated that the capacity for axial movement of the rods 50 (arrow H in FIG. 2) in relation to each respective pivot 43, and particularly the capacity for differential axial movement of the rods in relation to each other, facilitates this advantageous configuration. Thus, the support structure 67 is operably connected, at opposing ends of the support structure, to each rod 50 at a connection point on each rod, wherein the connection point is longitudinally fixed in relation to the rod. (In the present example, the described connection point is the front end 55 of each rod.) The configuration as shown in FIG. 4B is enabled by the fact that each rod 50 is configured in relation to each pivot 43, 43' to enjoy a degree of freedom which allows each rod a sliding motion backwards and, alternatingly, forwards through the pivot by which the rod is capable of moving the connection point closer to the pivot and, alternatingly, further from the pivot respectively. Further, the movement of one rod under this degree of freedom is substantially independent of the movement of the other rod under a corresponding degree of freedom. The result is the configuration shown in FIG. 4B in which one rod, and also its connection point, is moved by a distance "D" further than the other rod and its connection point when measured in a forwards direction.

Figure 5:
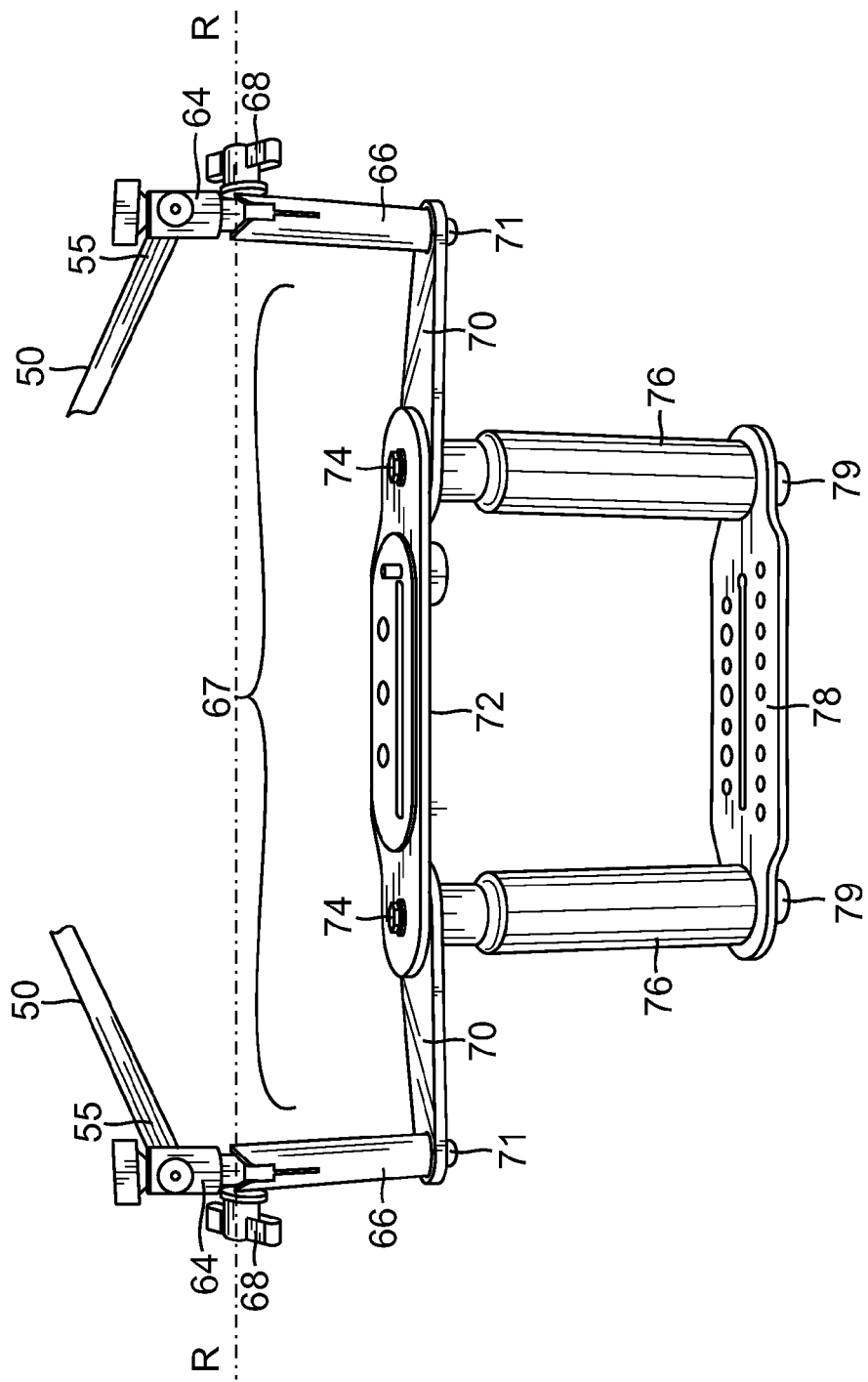
FIG. 5 is a front perspective view of features of the apparatus of FIG. 1.

Further, if the cameraman desires to adjust the distance of the camera from his body, for example to balance the camera without adjusting the pivoting length of the rods 50, he may move both handles backward or forward simultaneously by an equal distance, thereby imparting an advanced or retracted shape to the support structure 67. FIG. 4C exemplifies a retracted articulated shape of the support structure 67, in which the camera may be positioned closer to the cameraman's body without changing the orientation of the camera from a forward orientation. Another advantageous reason the cameraman may want to adjust the position of the camera backwards or forwards as exemplified for example in FIG. 4C, relates to rotation of the camera about axis R-R seen in FIG. 5. If, for example, the camera to be attached to the support structure 67 has a front-heavy center of gravity (for example, a center of gravity that is within the lens of the camera), then the cameraman may shift the center plate 72 backwards towards his body as exemplified in FIG. 4C. While the box of the camera will be attached to the center plate 72, leaving the lens extending over the front of the center plate, shifting the center plate backwards will cause the horizontal center of gravity of the camera to be adjusted to lie on top of the line identified as G-G in FIG. 4C—which is the "center of gravity line" which passes through the pins 71 (best seen in FIG. 5) by which the support structure 67 is operably supported by the front ends 55 of the rods 50. By adjusting the articulated configuration of the support structure 67, the camera's center of gravity along a horizontal axis may be positioned to coincide with the center of gravity line G-G. This is extremely advantageous when the cameraman unlocks the pins 68, for example, in preparation for rotating the camera about the axis R-R. For, without this feature, if the center of gravity of the camera were substantially removed from the center of gravity line G-G, then, in the event the cameraman accidentally let go of the handles, the camera would tend to flop forwards or backwards under the effect of gravity. However, under the principle of the present embodiment, adjusting the center of gravity of the camera, by adjusting the articulated shape of the support structure to coincide with center of gravity line G-G, avoids this result. The advantage may be increased if the camera is placed on the support structure 67, and its height is adjusted with a shim block 84 (exemplified in FIG. 8B), if necessary, so that the vertical center of gravity of the camera coincides with the axis of rotation R-R through the two pins 68, as indicated in FIGS. 5 and 8B. Thus, the center of gravity of the camera would coincide with both the horizontal center of gravity line G-G and the axis of rotation R-R. Under this configuration, if the cameraman rotates the camera through angle R (as exemplified in FIG. 6), and then accidentally lets go of the handles, the camera will not tend to rotate back under the influence of gravity to a downwardly hanging configuration (such as exemplified in FIG. 1), but will remain motionless in its rotated condition. Furthermore, under this configuration, the cameraman may smoothly rotate the camera by more than 180 degrees, from vertically upwards to vertically downwards (as exemplified in FIGS. 8A-C), without the camera tending develop any unwanted rotational force of its own under the influence of gravity. It will be appreciated that this advantage to the cameraman, of being able to arrange the camera's vertical center of gravity to coincide with the axis R-R, is enabled by configuring the support structure 67 to be displaced vertically downwards from the axis of rotation R-R. Thus, the vertical center of gravity of the camera, which may be perched on the support structure 67, can be adjusted to coincide with the axis R-R.

A third available function of the handles 76 is that they permit the cameraman to lock the camera support plate 67 in a selected angled configuration, such as exemplified in FIG. 4A to FIG. 4C, by rotating the handles about their own elongate axes. By rotating each handle, a threaded part of each pin 74 is driven to a locking position so that the center plate 72 is compressed against the outer plate 70 in a region of overlap, thereby frictionally preventing further rotation between the plates, until the handles 76 are once again rotated in the opposite direction.

A fourth available function of the handles 76 is that they permit the cameraman (preferably after he has unlocked pins 68) to slide both of the rods 50 forwards or backwards in their slide retainers 44 (or sockets 44'), to adjust the position of the camera in relation to the rig as a whole. Thus, by pushing both handles forward, the rods (and the camera mounted on the rods) may be slid forwards so that the camera tends to fall downwards on the pivoting rods. This action may be used by the cameraman when he wishes to have the camera at a low position in relation to his body, either for pointing the camera upwards from a low position, or to take a close-up image of an object close to the ground.

Figure 7:
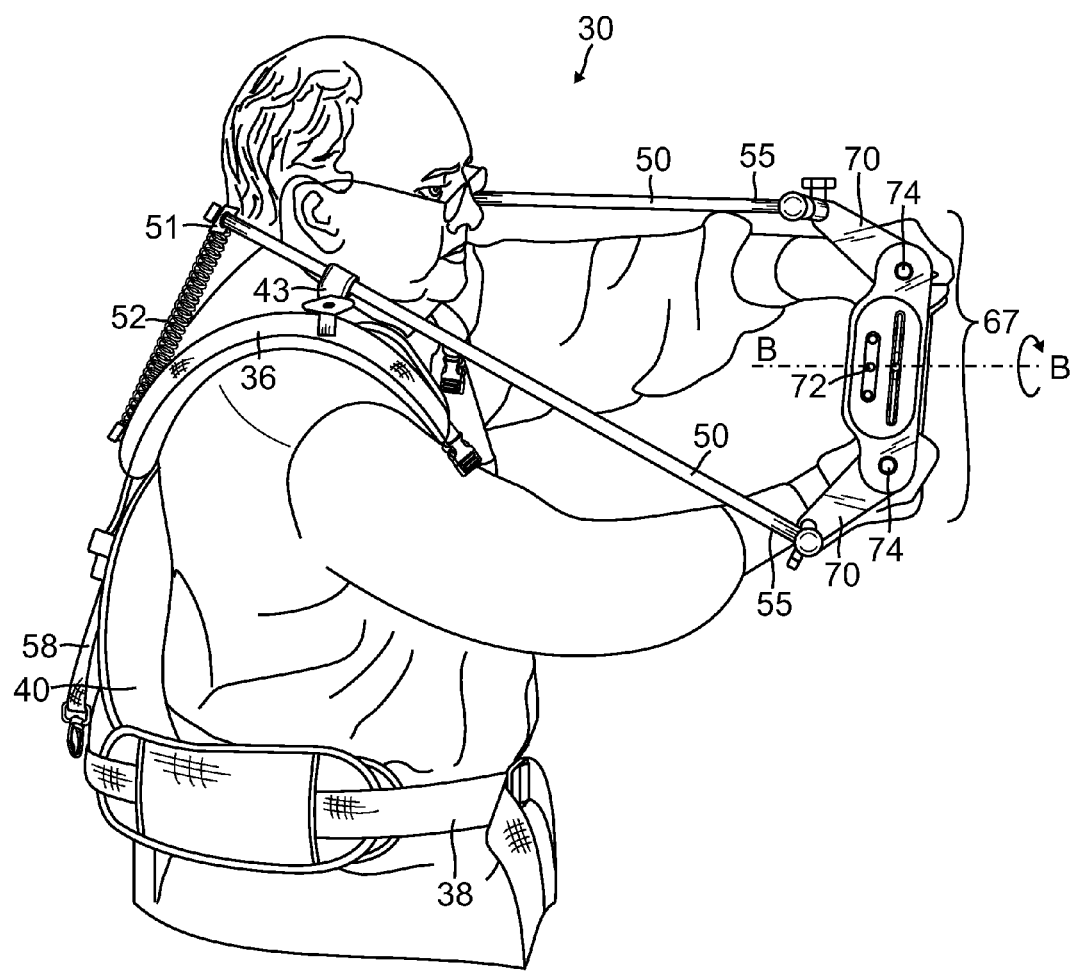
FIG. 7 is a perspective view of the apparatus of FIG. 1, shown in a fourth condition.

A fifth available function of the handles 76 is that they permit the cameraman to twist the rods "out of plane"— which is to say, he may pull one handle downwards, while pushing the other handle upwards so that the rods 50 rotate about the horizontally spaced pivots 43, with the result that the rods do not lie on any common plane. This effectively allows the cameraman to rotate the lens of the camera about an axis passing through the lens as indicated by arrow B in FIG. 7, without bending his body or moving one shoulder to a different level than the other. As may be seen in FIG. 7, the support structure 67 may be made to extend vertically, rather than horizontally as exemplified in FIG. 1. It will be appreciated that the angle of the camera support structure 67 may be aligned to any angle between horizontal and vertical, and in fact, the structure is capable of permitting the camera lens to rotate a full 180 degrees. In order for this twisted or "out of plane" configuration to be achieved, a number of advantageous aspects of the rig may be noted as contributing to the ease with which this achievement may be accomplished. First, is that the rods 50 (when the receivers 44 or sockets 44' are not locked) are permitted to twist about their axes while confined in the holes 45 of the slide receivers 44. Second, is that the rods 50 are permitted to slide backward or forward in the holes of the slide receivers 44 or sockets 44', so that the cameraman may select an appropriate length of each rod (not necessarily the same amount for each rod) to extend backwardly from the pivots 43, and thus achieve a desired amount of spring bias. Third, is that the back ends 51 of the rods may move up or down or sideways substantially independently of each other, thus allowing the back end of one rod to move upward and inwards while the back end of the other rod may, for example, move downward and inward, as may be envisaged with reference to FIG. 7. Fourth, is that the spring attached to the back end of one of the two rods acts independently of the spring attached to the back end of the other of two the rods, both in the vertical and in the horizontal vector components of each spring.

Under the thus described embodiments of the rig, the cameraman is afforded considerable advantages over prior art camera support systems. In addition to the advantages already described, the cameraman is able to orient his camera at an angle sideways from the forward direction of the rig 30, and then lock the support structure into the chosen shape by rotating the handles to lock the pins 74 which in turn lock the plates 70, 72 in relation to each other. This permits the cameraman to walk facing forward, thereby avoiding walking into vertical objects such as into trees, poles, and the like, while his camera points to the side and captures images to the side. Under prior art systems, the cameraman would have had to rotate his whole body sideways to orient the camera to a desired offset direction, thereby making it difficult for him or her to look forward, in the direction of motion. In extreme circumstances, such as in a war zone or other dangerous situation, the cameraman may even advance the camera, supported on the ends of the rods 50, beyond the corner of a building or structure while himself remaining safe behind the structure. The cameraman may set the angle of offset to ninety degrees (as exemplified in FIG. 4B) and film events taking place out of his direct view, but which may be visibly monitored by equipment such as a digital screen 34a (FIG. 1) which remains affixed to a front end of the horizontal rod 50, and which continues to face the cameraman for his easy reference and monitoring.

With reference to FIGS. 1 and 5, in some embodiments a spare plate 78 may be supplied and pinned by pins 79 to extend between lower ends of the two handles 76. The spare plate may be fitted with suitable holes and slots so that additional equipment, such as a battery pack 80 or the like (as exemplified in FIG. 1), may be supported by the rig 30. The spare plate 78 has the further functional advantage of stabilizing the two handles in relation to each other.

Furthermore, the presence and configuration of springs 52 at the back of pivoting support rods 50 has the advantageous feature of including springs that have a vertical force component, a horizontal force component, and that are therefore configured not only to lift the camera upwardly at the front end of the rods 50, but also to bias the front end of each rod outwardly, away from a line of symmetry of the rig. This has the advantage of assisting the cameraman to straighten out the camera support structure 67, and hence to align the plates 70,72 in the support structure into a straight line when desired. This feature has particular significance where a cameraman has caused the support structure to adopt a kinked shape such as seen in FIG. 4A to FIG. 4C, which he may have locked into a desired position. After unlocking the pins 74 in the support structure (by rotating the handles 76), the springs 52 at the back of the rig are configured, in some embodiments, to pull the front ends 55 of the rods outwardly and apart from each other, and thereby to automatically once again straighten the configuration of the support structure 67. It will be appreciated that the lateral movement of the rod ends 55, 51 that provides this advantage is made possible under the configuration of the present invention because of novel and useful features, including the fact that the back ends 51 of the rods are not connected to each other by any inflexible structure but are free to move laterally in relation to each other under the bias of the springs 52; and further, that the front ends 55 of the rods are operably connected to each other by a support structure that is capable of changing shape to be longer or shorter as desired.

Thus, the rig and system for camera stabilization provides an advantageous structure for easily manipulating a camera in active and stressful situations. The present invention may, of course, be carried out in other specific ways than those herein set forth without departing from the essential characteristics of the invention. For example, the support structure 67 may be connected directly to the front ends 55 of the support rods 50, without the intervening structure provided by the downward stubs 64 and the hangers 66. The present embodiments are, therefore, to be considered in all respects as illustrative and not restrictive, while the scope of the invention is set forth in the claims that follow.

I claim:

1. A rig for supporting a camera comprising:
   two shoulder supports, each shoulder support being configured to fit over a shoulder of a user and each shoulder support being operably connected to the other shoulder support;
   two elongate rods extending generally forwards, each rod having a front end and a back end;
   wherein, each rod is located to pivotingly rotate about one of two pivots located between the front end and the back end of each rod respectively, each pivot being supported by a respective shoulder support;
   further wherein, the front end of one rod is operably connected to the front end of the other rod via a support structure that is configured for supporting a camera, the support structure comprising three elongate plates connected to each other in series, namely, a left plate, a center plate, and a right plate, wherein each of two opposite ends of the center plate are connected by first pin joints to an inner end of each of the left plate and the right plate respectively, the first pin joints being configured to permit rotation of the plates in a horizontal plane; and
   further wherein, an outer end of each of the left plate and the right plate is operably connected to the front end of each rod respectively by second pin joints, the second pin joints being configured to permit rotation of the three plates in a horizontal plane, such that the three plates are configured to be movable by the user to form a desired articulated shape.

2. The rig of claim 1, further including two downwardly extending elongate handles that are connected to the support structure whereby movement of the handles by a user is capable of altering the articulated shape of the support structure.

3. The rig of claim 2, wherein each handle is connected to the support structure at a location of one of the first pin joints respectively.

4. The rig of claim 3, wherein each handle is configured in relation to each of the first pin joints such that axial rotation of each handle causes a threaded pin in the respective first pin joint to rotate and, temporarily, to frictionally lock the center plate to a respective left plate or right plate.

5. The rig of claim 1, further including:
   two downwardly extending hangers, each hanger having an upper end and a lower end, each hanger upper end being operably connected by a third pin joint to the front end of one of the rods, to permit rotation of each hanger backwards or forwards in a vertical plane extending substantially parallel with the rods, and wherein each hanger lower end is connected by the second pin joint to the left or right plate respectively.

6. The rig of claim 5, wherein each third pin-joint between rod and hanger includes a threaded pin that is configured to be rotatable to temporarily lock the third pin joint against rotation.

7. The rig of claim 1, further including a number of springs being at least one spring having an upper end and a lower end, the upper end being operably connected to at least one rod, the lower end being connected to an anchor that is operably connected to and held immovable in relation to the shoulder supports.

8. The rig of claim 7, wherein the number of springs is at least two springs, each spring being configured to extend from the back end of one of the rods respectively to the anchor, each spring being configured to provide a force to pivotingly bias the front end of each rod respectively generally upwards.

9. The rig of claim 8, wherein each spring is oriented in relation to the rig to include a component of orientation that is horizontal, whereby the upper end of each spring applies a vector component of force that biases the back end of each rod respectively to move horizontally inwards towards a symmetry line of the rig, and also pivotingly biases the front end of each rod respectively to move horizontally outwards away from the symmetry line.

10. A rig for supporting a camera comprising:
    two shoulder supports, each shoulder support being configured to fit over a shoulder of a user and each shoulder support being operably connected to the other shoulder support;
    two elongate rods extending generally forwards, each rod having a front end and a back end; and
    a support structure having opposite ends and being configured to support a camera, wherein each opposite end is operably connected to each rod respectively at a connection point on each rod;
    wherein, each rod is located to pivotingly rotate about one of two pivots located, respectively, between the front end and the back end of each rod, each pivot being supported by a respective shoulder support;

wherein, each pivot is configured to provide each respective rod with movement under at least one degree of freedom selected from a group of three degrees of freedom, namely:
vertical rotation about the pivot,
horizontal rotation about the pivot, and
sliding motion backwards and, alternatingly, forwards through the pivot by which the rod is capable of moving the connection point closer to the pivot and, alternatingly, further from the pivot respectively; and
wherein the at least one degree of freedom provided to one rod corresponds with the degree of freedom that is provided to the other rod;
further wherein, movement of one rod under the at least one degree of freedom is substantially independent of the movement of the other rod under a corresponding degree of freedom.

11. The rig of claim 10, wherein, each pivot is configured to provide each respective rod with movement under at least two degrees of freedom selected from the group of three degrees of freedom;
further wherein, movement of one rod under each of the at least two degrees of freedom is substantially independent of the movement of the other rod under corresponding degrees of freedom.

12. The rig of claim 10, wherein, each pivot is configured to provide each respective rod with movement under the three degrees of freedom selected from the list of three degrees of freedom; and
further wherein, movement of one rod under each of the three degrees of freedom is substantially independent of the movement of the other rod under corresponding degrees of freedom.

13. The rig of claim 10, further including a number of springs being at least one spring having an upper end and a lower end, the upper end being operably connected to at least one rod, the lower end being connected to an anchor that is operably connected to and held immovable in relation to the shoulder supports.

14. The rig of claim 10, wherein the number of springs is at least two springs, each spring being configured to extend from the back end of one of the two rods respectively to the anchor, each spring being configured to provide a force to pivotingly bias the front end of a respective rod generally upwards.

15. The rig of claim 14, wherein each spring is oriented in relation to the rig to include a component of orientation that is horizontal, whereby the upper end of each spring applies a vector component of force that biases the back end of each rod respectively to move horizontally inwards towards a vertical symmetry line of the rig, and also pivotingly biases the front end of each rod respectively to move horizontally outwards away from the symmetry line.

16. The rig of claim 10, wherein each pivot defines a cylindrical hole for slidably receiving each rod respectively.

17. The rig of claim 16, wherein each pivot includes a threaded pin passing through the pivot, the pin being rotatable to sequentially lock and unlock the pivot, whereby the pivot has an unlocked condition in which the rod may slide through the cylindrical hole, and a locked condition in which the rod is frictionally prevented from sliding through the cylindrical hole.

18. The rig of claim 16, wherein each pivot includes:
an elongate axle having an axis that extends generally vertically, the axle being fixed to one of the shoulder supports and being configured to be rotatable about the axis; and
a receiver connected to an upper end of the axle by a pin-joint configured to permit rotation of the receiver in a vertical plane, the receiver defining the cylindrical hole for receiving the rod.

19. The rig of claim 16, wherein each pivot includes:
a ball that is fixed to one of the shoulder supports; and
a socket configured to receive the ball and to rotate about the ball both about a horizontal axis and about a vertical axis, the socket defining the cylindrical hole for receiving the rod.

20. A rig for supporting a camera comprising:
two shoulder supports, each shoulder support being configured to fit over a shoulder of a user and each shoulder support being operably connected to the other shoulder support;
two extender elements, each extender element connected to a shoulder support respectively and extending downwardly;
a belt for stabilizing the shoulder supports, the belt including a rigid skeleton, the belt being separated from the shoulder supports by a vertical distance;
two elongate rods extending generally forwards, each rod having a front end and a back end and being configured to support a camera at the front end, wherein, each rod is located to pivotingly rotate about one of two pivots located between the front end and the back end of each rod respectively, each pivot being supported by a respective shoulder support; and
a number of springs being at least one spring having an upper end and a lower end, the upper end being operably connected to at least one rod, the lower end being connected to an anchor that is operably connected to the rigid skeleton;
wherein, each extender element slidingly passes through the rigid skeleton, and further wherein each extender element includes a registration pin for locking a position of the extender element in relation to the skeleton, whereby, the vertical distance may be adjusted to a desired amount.

21. The rig of claim 20, wherein the number of springs is at least two springs, each spring being configured to extend from the back end of one of the rods respectively to the anchor, each spring being configured to provide a force to pivotingly bias the front end of a respective rod generally upwards.

22. The rig of claim 21, wherein each spring is oriented in relation to the rig to include a component of orientation that is horizontal, whereby the upper end of each spring applies a vector component of force that biases the back end of each rod respectively to move horizontally inwards towards a symmetry line of the rig, and also pivotingly biases the front end of each rod respectively to move horizontally outwards away from the symmetry line.

23. The rig of claim 20, wherein the anchor slidingly passes through the skeleton, the anchor including a registration pin for locking the position of the anchor in relation to the skeleton, whereby the anchor is adjustable in a vertical direction in relation to the shoulder supports, and further whereby, tension in the at least one spring may be adjusted.

24. A rig for supporting a camera comprising:
two shoulder supports, each shoulder support being configured to fit over a shoulder of a user and each shoulder support being operably connected to the other shoulder support;
two elongate rods extending generally forwards, each rod having a front end and a back end, wherein, wherein, each rod is located to pivotingly rotate about one of two pivots located between the front end and the back end of each rod respectively, each pivot being supported by a respective shoulder support; and a horizontal support structure configured to support a camera, the support structure having two opposite ends and being suspended from two hangers, each hanger having an upper end and a lower end, the upper end of each hanger being operably connected by a first pin joint to the front end of each rod respectively, the lower end of each hanger being connected to one of the two ends of the support structure respectively;

wherein, the support structure is configured to rotate about an axis passing through the first pin joints; and two downwardly extending elongate handles that are connected to the support structure whereby movement of the handles by a user is capable of rotating the support structure about the axis.

25. The rig of claim 24, wherein the support structure comprises three elongate plates connected to each other in series, namely, a left plate, a center plate, and a right plate, wherein each of two opposite ends of the center plate are connected by second pin-joints to an inner end of each of the left plate and the right plate respectively, the second pin joints being configured to permit rotation of the plates in a horizontal plane; and further wherein, an outer end of each of the left plate and the right plate is connected to the lower end of each of the hangers respectively by a third pin-joint in a horizontal plane, whereby the three plates are configured to be movable by the user to form a desired articulated shape.

26. The rig of claim 25, wherein each handle is connected to the support structure at a location of one of the two second pin joints respectively.

27. The rig of claim 25, wherein each handle is configured in relation to each of the second pin joints such that axial rotation of each handle causes a threaded pin in the respective second pin joint to rotate and, temporarily, to frictionally lock the center plate to a respective left plate or right plate.

* * * * *